United States Patent [19]
Sisco et al.

[11] Patent Number: 5,231,893
[45] Date of Patent: Aug. 3, 1993

[54] DUAL MODE DAMPER

[75] Inventors: William C. Sisco, Homer; Timothy M. Haylett, Sherwood, both of Mich.

[73] Assignee: Simpson Industries, Inc., Bingham Farms, Mich.

[21] Appl. No.: 805,381

[22] Filed: Dec. 10, 1991

[51] Int. Cl.$^5$ ............................ F16F 15/10; F16C 3/04
[52] U.S. Cl. ................................................ 74/574; 74/604
[58] Field of Search .............. 74/574, 600, 604, 573 R

[56] References Cited

U.S. PATENT DOCUMENTS

| | | | |
|---|---|---|---|
| 2,939,338 | 6/1960 | Troyer | 74/574 |
| 2,972,904 | 2/1961 | Troyer | 74/574 |
| 2,992,569 | 7/1961 | Katzenberger | 74/574 |
| 3,479,907 | 11/1969 | Hall | 74/574 |
| 3,945,269 | 3/1976 | Bremer, Jr. | 74/574 |
| 4,083,265 | 4/1978 | Bremer, Jr. | 74/574 |
| 4,318,309 | 3/1982 | Bremer, Jr. | 74/574 |
| 4,378,865 | 4/1983 | McLean | 188/379 |
| 4,395,809 | 8/1983 | Whiteley | 29/451 |
| 4,710,152 | 12/1987 | Ichikawa et al. | 474/166 |
| 4,794,816 | 3/1989 | Serizawa et al. | 74/574 |
| 4,815,332 | 3/1989 | Serizawa et al. | 74/573 |
| 4,881,426 | 11/1989 | Serizawa et al. | 74/574 |
| 5,025,681 | 6/1991 | Andrä | 74/574 |

FOREIGN PATENT DOCUMENTS

| | | | |
|---|---|---|---|
| 2537390 | 7/1977 | Fed. Rep. of Germany | 74/604 |
| 1574846 | 9/1980 | United Kingdom | 74/574 |
| 2146408 | 4/1985 | United Kingdom | 74/574 |

Primary Examiner—Allan D. Herrmann
Assistant Examiner—David W. Laub
Attorney, Agent, or Firm—Brooks & Kushman

[57] ABSTRACT

A crankshaft vibration damper which has an unique elastomer member positioned between a hub and outer annular inertia member. The hub is configured for connection to the accessory drive end of the crankshaft. The inertia member may or may not be grooved to accept an accessory drive belt. The resilient elastomer member is dimensionally and chemically developed to dampen torsional and bending vibrations when assembled between a corresponding curved hub and inertia member. The radially outward or inward curvature of the hub and inertia member is selected to be sufficient to effectively reduce crankshaft bending vibration.

13 Claims, 5 Drawing Sheets

DUAL MODE DAMPER

TECHNICAL FIELD

The present invention relates generally to damper devices which are used to dampen or reduce the vibration and noise of various parts of an internal combustion engine, particularly the crankshaft.

BACKGROUND ART

As is well known in the art, internal combustion engines, such as a gasoline engine, are used to drive cars or other vehicles, and the power of the reciprocating operation of the cylinders of the engines is transmitted to the wheels from one end of the crankshaft. The other end of the crankshaft is used to drive various auxiliary machinery, such as alternators, power steering and air conditioning compressors, through a pulley arrangement and one or more belts.

The crankshafts of internal combustion engines are subjected to considerable torsional vibration due to the sequential explosion of combustible gases in the cylinders. The application of forces of rotation are not smooth and continuous. Unless controlled, the vibrations can often lead to failure of the crankshaft itself, and/or also contribute to failure in other parts of the engine or cooling system, particularly where resonance occurs. The vibrations also can cause noises such as a "whine" or knocking, both of which are highly undesirable.

For many years, this problem has been recognized and a variety of devices have been constructed and used to lessen the torsional vibrations. One of the common forms of torsional damper comprises an inner metal hub attached to the end of the crankshaft, an outer metal annular member, and an elastomer member positioned between the hub and outer member. The outermost annular or ring member is often called the "inertia member". The hub directly executes the vibrations created by the crankshaft because it is rigidly coupled to it. The inertia member is coupled to the hub by the elastomer and accordingly causes a phase lag between the oscillations of the hub and the corresponding oscillations of the inertia member.

Vibration dampers of this type are disclosed, for example, in the following U.S. Pat. Nos. 2,939,338, 2,972,904, 3,479,907, 3,945,269, 4,083,265, 4,318,309, 4,378,865, and 4,395,809. Some of these patented devices relate specifically to overcoming axial shifting of the damper parts, and most are directed to the problem of overcoming torsional vibrations.

Many modes of vibration are produced by the rotating crankshaft of an engine. Torsional and bending are the two main modes of concern. Torsional vibration occurs angularly about the longitudinal axis of the crankshaft. The bending vibration mode is similar to the bending mode of a cantilevered beam. The fixed end of the crankshaft, or node, would be at some point within the engine crankcase. Conventional dynamic damping devices, such as the torsional damper devices described above, are not satisfactory to dampen or reduce such complex vibrations.

In recent years, some dual mode vibration damper devices have been proposed for the purpose of dealing with the torsional and bending vibrations associated with increased operating performance of engines. These damper devices have incorporated a pair of inertia members, a first inertia member for damping the torsional vibrations, and a second inertia member for damping the bending vibrations. The torsional vibration damper is generally of conventional construction with an annular inertia member connected to a hub through an elastomer member. The bending vibration damper comprises a second inertia member typically positioned radially inwardly of the first inertia member in an inner space of the pulley construction. The second inertia member is connected to the hub through a second elastomer member.

Dual mode damper configurations are shown, for example, in the following U.S. Pat. Nos. 4,710,152, 4,794,816, 4,815,332 and 4,881,426. These vibration damper constructions utilize two separate inertia members and two resilient elastomer members which adds additional weight to the engine and additional cost. Also, new assembly tooling and techniques are needed to construct them which adds further cost and expense.

DISCLOSURE OF THE INVENTION

It is an object of the present invention to provide a damper device for an engine which dampens or reduces both the torsional vibration as well as the bending vibration of the crankshaft, and does so with a simpler and less expensive construction than is presently known.

It is another object of the present invention to provide a dual mode damper which allows tuning of the torsion and bending vibrations separately without interference or adverse effects on the other.

It is still another object of the present invention to provide a dual mode damper which can be assembled with existing tooling and use of existing techniques.

These and other objects are met by the present invention which provides a unique elastomer member positioned between a hub and outer annular inertia member. The hub is configured for connection to the accessory drive end of the crankshaft. The inertia member may or may not be grooved to accept an accessory drive belt. The resilient elastomer member is dimensionally and chemically developed to dampen torsional and bending vibrations when assembled between a correspondingly curved hub and inertia member. The radially outward or inward curvature of the hub and inertia member is selected to be sufficient to effectively reduce crankshaft bending vibrations.

The elastomer member is first preselected with a certain size and cross-sectional area sufficient to dampen or reduce the torsional vibrations of the crankshaft of the particular engine. The curve of the elastomer member is then selected to sufficiently dampen or reduce the bending vibrations found to exist in that engine. The hub and outer annular inertia member are configured to provide the curved shape necessary to accommodate the desired shape of the resilient member.

The assembly of the dual mode damper is carried out by holding the hub and inertia member securely in position in a jig or the like, and forcing the resilient member into the curved annular space left between them.

BEST MODE(S) FOR CARRYING OUT THE INVENTION

Figure 1:
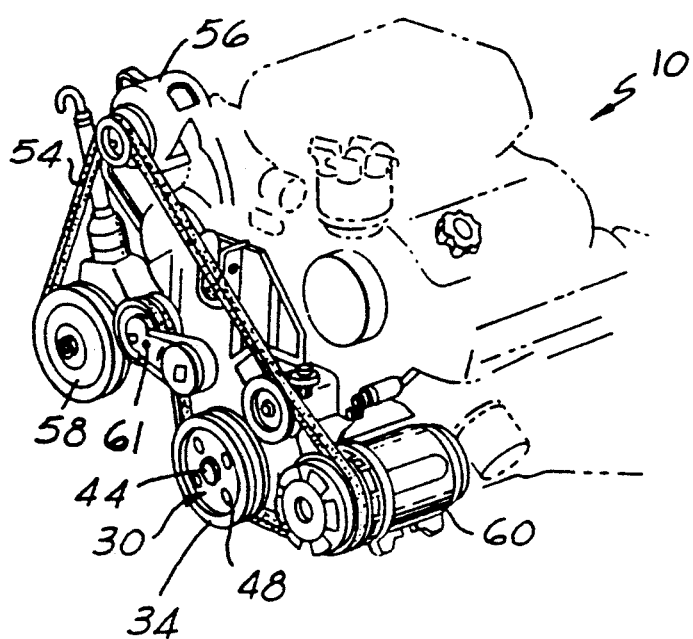
FIG. 1 illustrates an engine depicting the use of the present invention.
Figure 2:
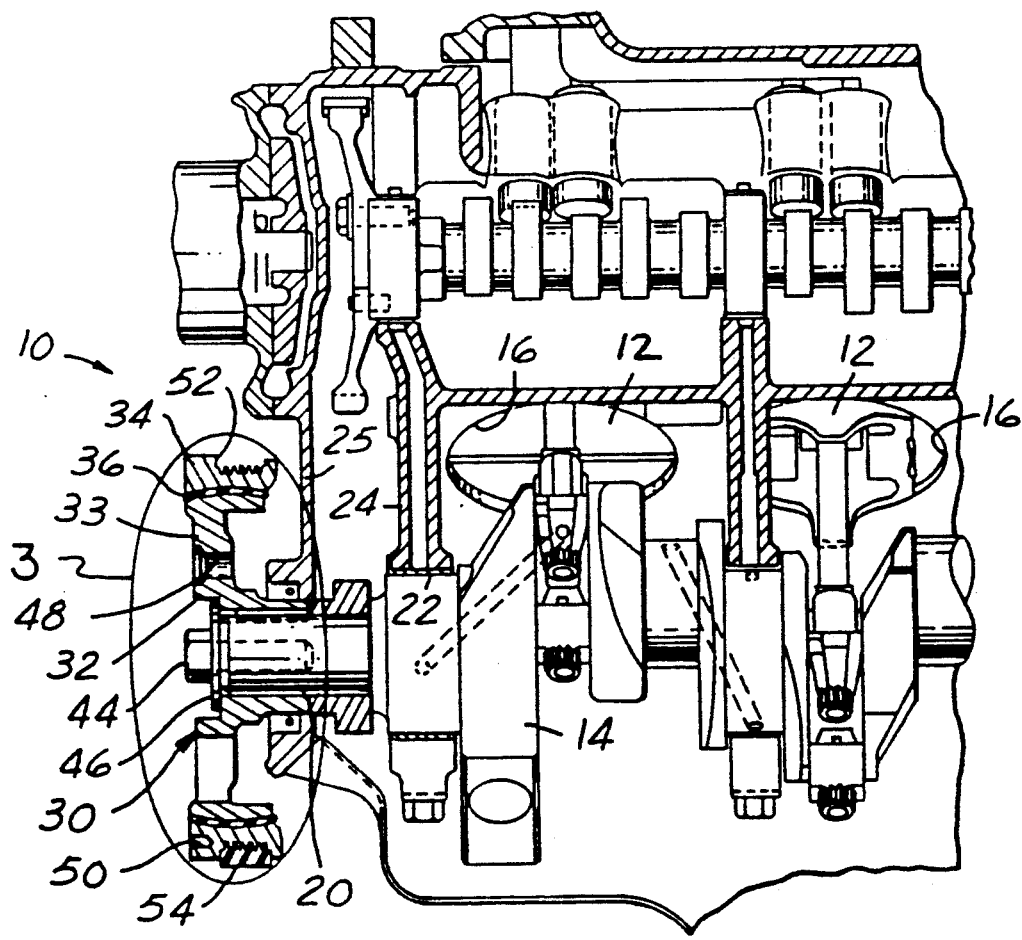
FIG. 2 is a schematic cross-section of an engine showing use of the present invention.

FIGS. 1 and 2 illustrate in a schematic manner an internal combustion engine 10 of the kind which are in use today on various vehicles. The engine depicted has a V-6 configuration with six cylinders. A perspective view of an engine is shown in FIG. 1 and a partial cross-sectional view of an engine is shown in FIG. 2.

The engine 10 has a number of pistons 12 connected to a crankshaft 14. The movement of the pistons caused by the explosion of the gases in the cylinders 16, rotates the crankshaft 14. One end of the crankshaft (not shown) is connected to a transmission and drive train and is used to drive the wheels of the vehicle. The other end 20 of the crankshaft (often called the "nose") is positioned in main bearing 22 in the block 24 of the engine and protrudes through the front wall or cover 25.

A damper 30 is securely attached to the end 20 of the crankshaft. The damper 30 has a central hub 32, a web or series of spokes 33, and an outer annular ring 34. The ring 34 is the damper inertia member. Positioned between the hub 32 and the inertia member 34 is an annular resilient elastomer member 36.

The hub 32 is tightly positioned on the nose 20 of crankshaft 14 by an interference fit. The hub is also keyed to the crankshaft with metal key 38 which fits within elongated slots 40 and 42 in the hub and nose, respectively. A bolt 44 and washer 46 are also used to secure the damper to the end of the nose.

A series of bores or openings 48 in the damper are used to assist in its removal from the crankshaft if that becomes necessary. Bore 50 in the inertia member 34 is representative of the drilled balance holes that typically are needed to accurately balance the hub and inertia member after they are assembled.

The inertia member 34 has a recessed belt track 52 in its outer surface for positioning of an engine belt 54. In the engine shown in FIG. 1, a single belt 54 is used to drive all of the accessories, such as the alternator 56, power steering compressor 58 and air conditioning compressor 60. Tension in the belt is maintained by the tensioner device 61. It is understood that the design of many engines require the use of two or more belts, and that the present invention can be used in all of these engines, regardless of the number of belts actually utilized.

Figure 3:
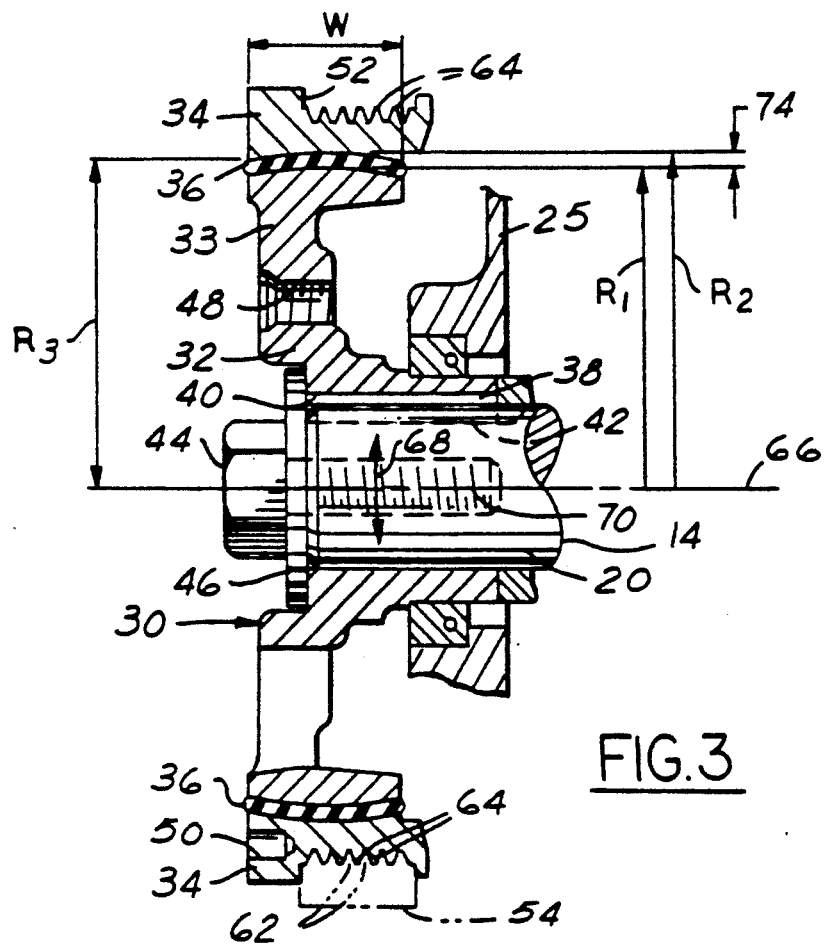
FIG. 3 is an enlarged view of the dual mode damper invention as shown in FIGS. 1 and 2.

The inner surface of the belt 54 has a series of parallel toothed ridges 62 which fit within the belt grooves 64 in the track 52 of the inertia member 34 (see FIG. 3). The mated ridges and grooves help prevent the belt from jumping or sliding axially out of the track.

The crankshaft 14 has a central axis of rotation 66 (shown in FIG. 3). When the engine is operating, the force of the pistons 12 on the crankshaft 14 cause the crankshaft to vibrate torsionally and generally perpendicular during its rotation around the axis 66. The vibrations of the crankshaft are complex, but most can be categorized as either torsional or bending vibrations. The bending vibrations are in a direction 68 generally perpendicular to the crankshaft axis 66 and the forces rotate around a point 70 along the axis 66, where the nose end 20 of the crankshaft is cantilevered through the main bearing in the engine wall 24. Although the actual bending movement is rotational around point 70, the actual displacement is sufficiently small such that the movement can be deemed to be "generally perpendicular". The displacement of the crankshaft due to the bending vibrations is on the order of 0.001-0.015 inches, and the resulting effect of annoying noise and possible deleterious effect on the crankshaft and other engine parts can be significant.

The selection of the size, type and mass of the elastomer material for the damper in order to reduce torsional vibrations is made in accordance with conventional techniques and standards. The damper is designed according to the particular engine involved. The frequency of the torsional vibrations of the crankshaft of the engine is either known from past experiences with the same or similar engines, is determined experimentally from a dynamic test of the engine, or is calculated by a computer using finite element analysis. Once this is determined, the size and inertia of the inertia member and the size and type of elastomer material are selected and the damper design is then determined. Typically, a damper with a gap 74 approximately 0.100-0.125 inches in width is selected. (Dampers with gaps of this size are in common use on automobile engines today.)

The amount of the curvature of the resilient member 36 of the dual-mode damper 30 also depends on the actual bending vibrations of the engine. Again, the natural vibration frequencies can be determined theoretically by computer, or the engine can be tested and the bending vibrations determined experimentally. Once the frequency of the bending vibration is determined, the shape of the curvature is selected.

The selection of the curvature of elastomer material for a damper for use on an engine in accordance with the present invention can be illustrated by reference to the following example. A series of specially constructed dampers were tested. The dampers were all the same, except for the shape of the gap in which the elastomer material was positioned. The dimensions of the damper, the width of the gap, and the elastomer material were the same for each one.

Figure 4:
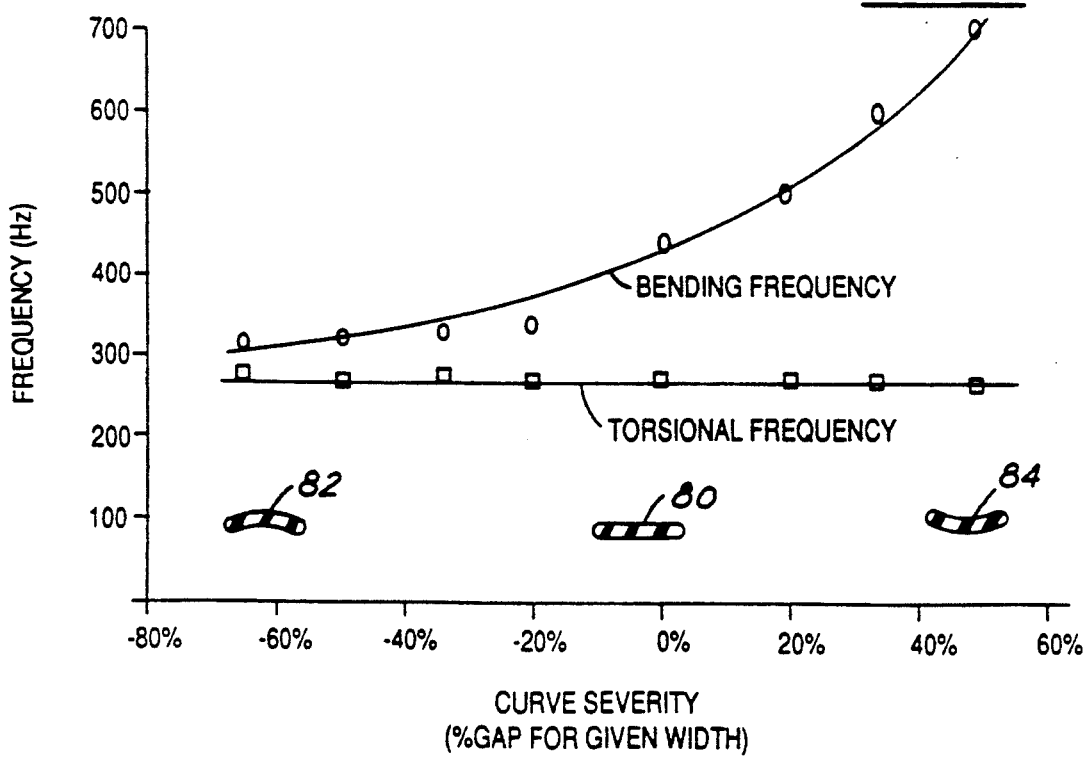
FIG. 4 is a graph illustrating the functioning of several dual mode damper designs.

The results of the bench tests on the several damper constructions are shown in FIG. 4. For these tests, the dampers were held tightly on a bench or in a vise. They were struck with a hammer and the frequencies of vibration recorded by accelerometers. With an elastomer member having a straight (i.e. non-curved) cross-section 80, the frequency of the torsional vibrations which would be reduced by this damper was about 275 Hz and the frequency of the bending vibrations was about 450 Hz. A damper having an elastomer material with a curve severity of −20% had a torsional frequency at about 275 Hz and a bending frequency at about 350 Hz. The curve severity was measured as the percentage of the gap that the convex edge of the hub displaced. At the most outwardly curved damper construction tested (identified by reference numeral 82), the curve severity was −65% and the dampened torsional and bending frequencies recorded were about 275 Hz and 325 Hz, respectively.

When the curvature of the elastomer material was curved inwardly (identified by numeral 84), the frequency of the bending vibrations which were absorbed by the damper also changed. At a curve severity of +20%, the dampened torsional frequency was about 275 Hz and the dampened bending frequency was about 530 Hz. At the most inwardly curved damper construction tested (see FIG. 4), the curve severity was +50% and the dampened torsional and bending frequencies recorded were about 275 Hz and 650 Hz, respectively.

The prototype dampers were then tested on an actual engine and the results graphed. The engine was a 3.1 liter GM (Chevrolet) V-6 engine. The prototype dampers were tested relative to a commercial damper which had an elastomer member with a straight (0%) cross section.

Figure 5:
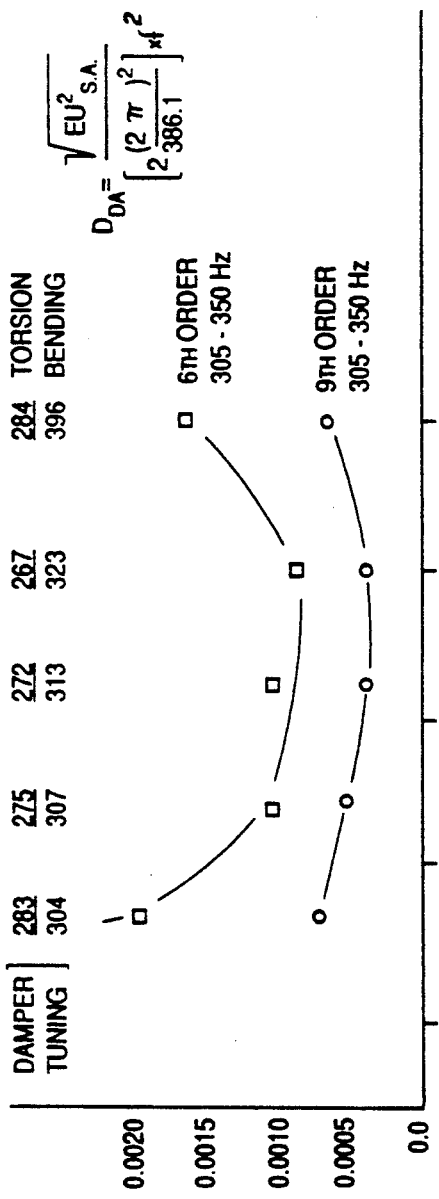
FIGS. 5 and 6 graph the amplitudes of the bending and torsional vibrations of an engine crankshaft.
Figure 6:
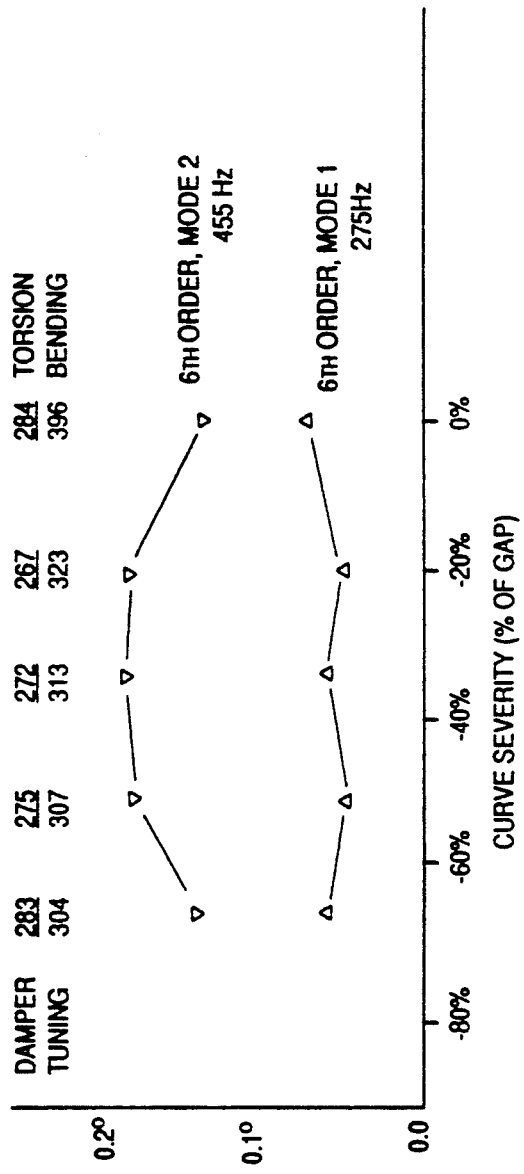

FIG. 5 shows the amplitude of the bending vibrations of the crankshaft and FIG. 6 shows the amplitude of the torsional vibrations of the crankshaft of the GM engine. In the tests, the 6th and 9th orders of vibration were found to be the most active in the bending mode, and so the other orders are not shown for clarity purposes. The 6th order was found to be the most active in the torsional mode and again the other orders are not shown for clarity. The minimum deflection or bending of the crankshaft nose was about 0.001 inches at resonance and occurred when testing a damper which had a torsional frequency of 267 Hz and a bending frequency of 323 Hz. The minimum amplitude of the torsional vibrations was about 0.15° at resonance and occurred with a damper which had torsional frequencies in the range of 267-275 Hz and bending frequencies in the range from 307-313 Hz. Based on this analysis, a damper which dampened torsional frequencies at about 265-275 Hz and dampened bending frequencies at about 320-325 Hz would be the most suitable.

Figure 7:
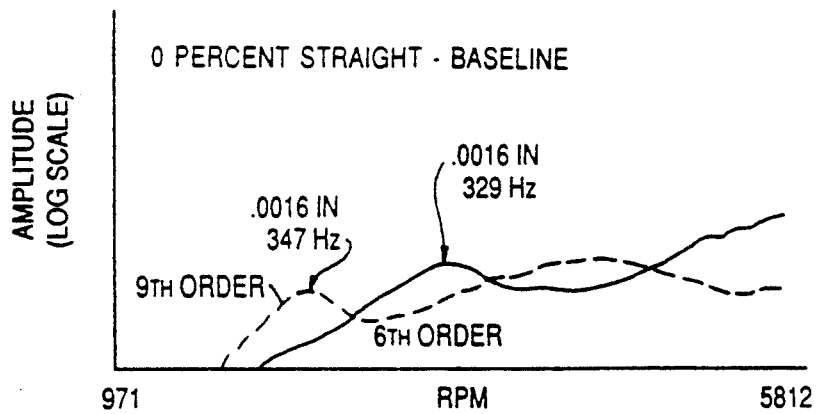
FIGS. 7-11 illustrate the usage and benefits of the present invention.
Figure 8:
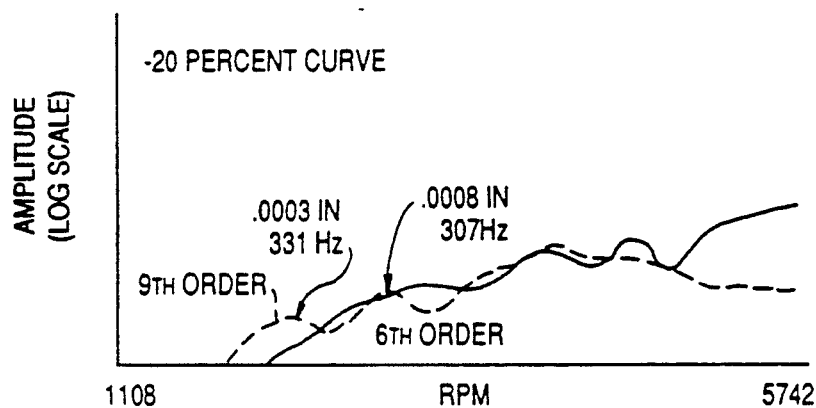

FIGS. 7 and 8 show the comparison on an actual engine between the baseline damper with a straight elastomer material cross-section (i.e. a conventional damper designed only to dampen, or reduce, torsional vibration) and a damper with a −20% curved elastomer material. As shown in FIG. 7, the 6th and 9th orders of vibration had prominent bending vibration peaks of 0.0016 in. and 0.0006 in. at 329 Hz and 347 Hz, respectively. These are the areas of most concern and are the targeted peaks for the bending damper to counteract. With a −20% curve severity damper construction, the bending vibrations at the 6th and 9th orders were significantly reduced to 0.0008 in. and 0.0003 in., respectively. (FIG. 8).

Figure 9:
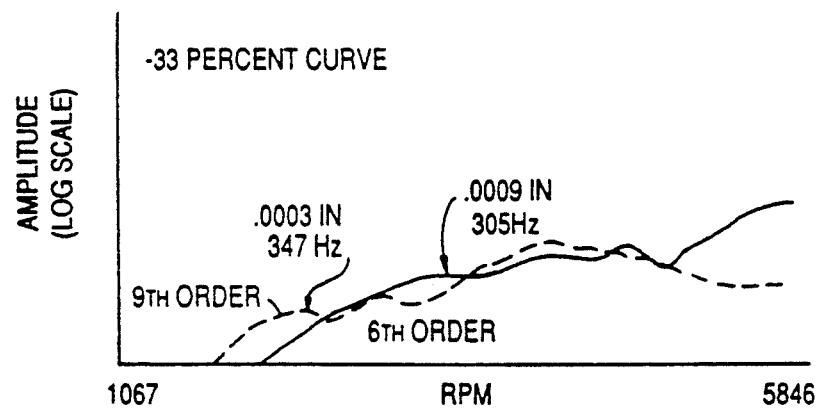
Figure 10:
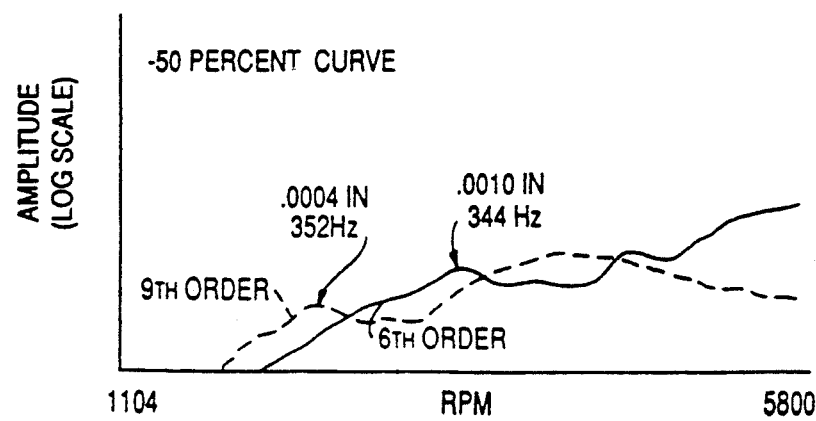

The bending peaks also were significantly reduced by a damper having a −33% curve severity, as shown in FIG. 9. The bending vibrations with this elastomer damper construction were 0.0009 in. at the 6th order and 0.0003 in. at the 9th order. At a −50% curve severity (FIG. 10), the bending peaks at the 6th order (0.0010 in.-344 Hz) and the 9th order (0.0004 in.-352 Hz) started to increase as the bending frequency of the damper was passing out of the applicable frequency range for a bending damper to work on the engine.

Figure 11:
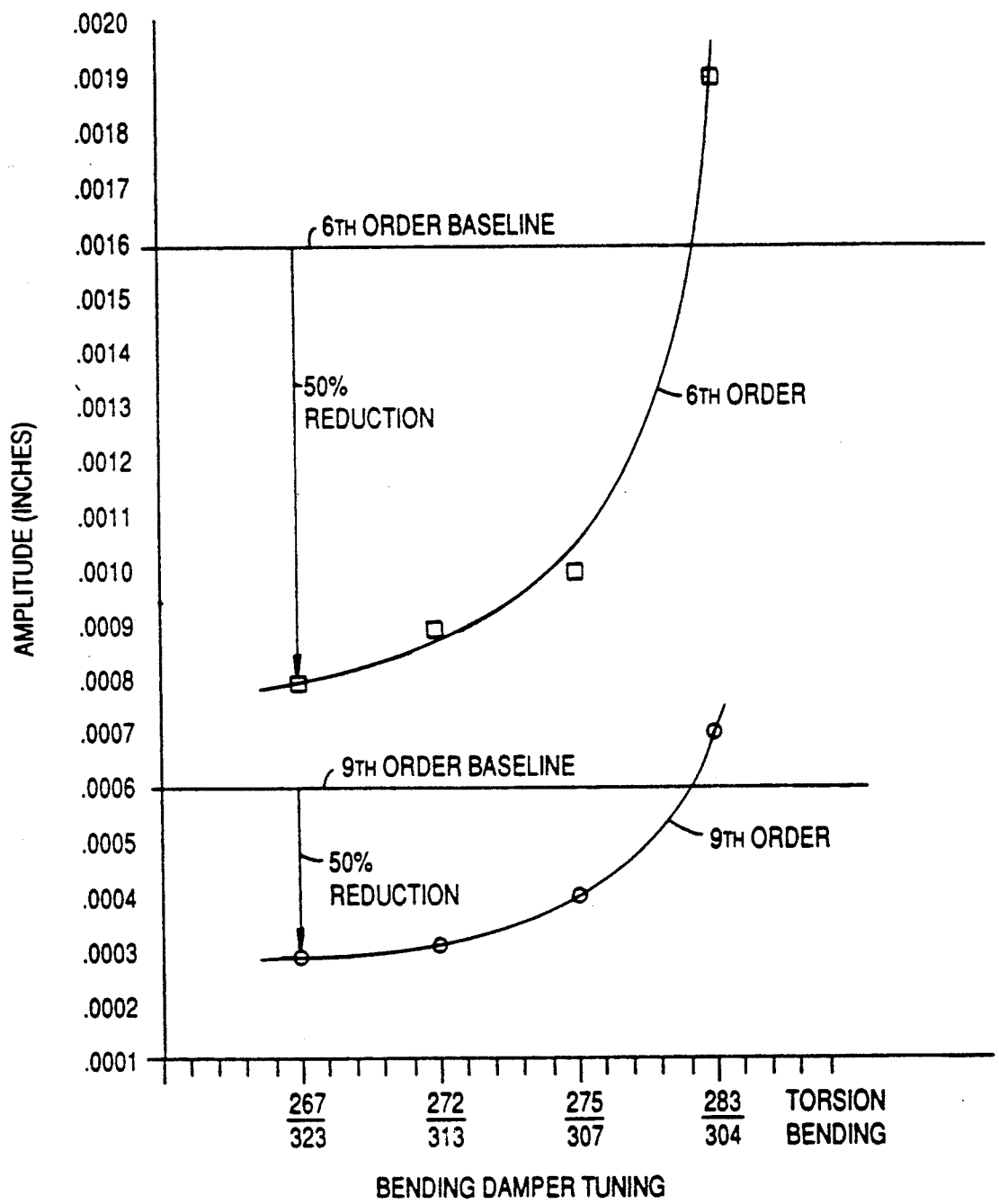

FIG. 11 graphically illustrates the advantages of the present invention. By curving the configuration of the elastomer material as indicated in accordance with the invention, the amplitude of the bending vibrations was reduced about 50% from the baseline reference. (At the baseline, the stock damper was tuned at 284 Hz in torsion and 396 Hz in bending.)

From these tests, it is shown that the damper configurations tested can significantly reduce bending vibration amplitudes without adversely affecting the torsional damping performance of the damper. Also, since the bending frequency changed significantly with the differently curved configurations, but the torsional frequency remained effectively the same, the damper can be tuned for bending frequency after the torsional frequency has been established.

It is understood that each type or model of engine will have different frequencies for the torsional and bending vibrations and that each will have to be tuned with a different damper. This means that the curve severity of the elastomer material will probably be different for each type or model of engine, although it can be determined in accordance with the above procedures. The range of curve severities for the various dampers thus will differ depending on the engine and damper device utilized.

A bonding agent such as "Chemlock" from Hughson Cements, a division of Lord Chemical, optionally can be applied to the surfaces of the elastomer member 36 prior to assembly, as is well known in the industry. The agent preferably is heat activated and, after the parts of the damper 30 are assembled, the damper is subjected to heat sufficient to activate the bonding agent. This helps prevent the inertia member and hub from shifting relative to one another during use, and also helps keep the elastomer member in position.

The elastomer member may consist of natural rubber or a synthetic elastomeric composition as defined by specification SAE J200. Suitable synthetic elastomers include styrene butadiene rubber, isoprene rubber, nitrile rubber, ethylene propylene copolymer, and ethylene acrylic.

The hub and inertia members are preferably made from metal materials, such as steel, cast iron and aluminum. One common combination of materials utilizes automotive ductile cast iron (SAE J434) for the hub and automotive gray cast iron (SAE J431) for the annular ring. Another known combination of materials for the damper comprises die cast aluminum (SAE 308) for the hub and cast iron for the inertia member.

The construction of dual-mode damper 30 of the present invention allows assembly in a conventional way with conventional assembly tools and techniques. The hub 32 and inertia member 34 are held in place in a jig or fixture (not shown) leaving an annular space for entry of the elastomer member 36. The member 36 is then formed into a ring shape and placed in an appropriate fixture over the annular space. Hydraulic or pneumatic pressure is then used to force the elastomer member into the annular space.

The elastomer member 36 is preferably in a state of radial compression between the hub and inertia member. The member 36 is stretched and changed in cross-section when it is forced into the annular space. The inherent resiliency of the rubber helps keep the member 36 in place and the hub and inertia members together.

One practical limitation on the curvature of the resilient member 36 is that the curvature should not be so extreme that the inertia member cannot be assembled over the hub. This means that the maximum radius $R_1$ of the curved outer surface of the hub 32 cannot exceed the minimum radius $R_3$ of the inertia member 34 (see FIG. 3). If the curve of the annular space was such that radius $R_3$ was less than radius $R_1$ then the two members might not be able to physically fit over one another for assembly. In that case, the inertia member, for example, would have to be constructed in two parts and then fastened together, creating significant extra cost and assembly time.

A formula for determining the maximum amount of curve allowable for radially outward curvature before assembly interference occurs is as follows:

$$\frac{h}{G} \times -100 = \% \text{ curve, where } 0 < h < G.$$

A formula for determining the maximum amount of curve allowable for radially inward curvature before assembly interference occurs is as follows:

$$\frac{h}{g} \times 100 = \% \text{ curve, where } 0 < h < G.$$

For these two formulae, G is the damper gap ($R_2 - R_1$ in FIG. 3), W is the width of the inertia member across its rubber contact surface, and $$h = R_1 - \frac{1}{2}\sqrt{4R_1^2 - W^2}.$$

Also, the percent of curve severity is $$\frac{h}{G} \times \pm 100.$$

Although particular embodiments of the present invention have been illustrated in the accompanying drawings and described in the foregoing detailed description, it is to be understood that the present invention is not to be limited to just the embodiments disclosed, but that they are capable of numerous rearrangements, modifications and substitutions without departing from the scope of the claims hereafter.

It is claimed:

1. A method of tuning with a damper, the torsional and bending vibration of an engine crankshaft, the damper having a pair of spaced members, the spaced members comprising a central hub member and an outer inertia ring member, the method comprising the steps of:
   preselecting a band of resilient material having a cross-sectional area in the axial direction of the members sufficient in cooperation with the character of resilience of the material to dampen the torsional vibrations of the crankshaft when the band is in the space between the members,
   the members providing a space which has a uniform curvature completely around the circumference of the damper, and
   curving said cross-sectional area of the preselected band and the space between the hub and ring members radially sufficiently to dampen the bending vibrations of the crankshaft when the band is in the space between the members.

2. The method of claim 1 wherein the band and space are curved radially outwardly.

3. The method of claim 1 wherein the cross-sectional area of the preselected band is curved by forcing the band into the curved space between the members.

4. The method in accordance with claim 1 wherein the band and space are curved radially inwardly.

5. A crankshaft vibration damper comprising:
   a hub member adapted for connection to a crankshaft;
   a first ring member adapted for connection to a belt drive and spaced concentrically from the hub member; and
   a second ring member of resilient material situated in the space between said hub member and said first ring member for joining the hub and first ring members together;
   said second ring member having a cross-sectional area and chemical composition before joining the hub and first ring members together sufficient to dampen the torsional vibrations of the crankshaft when the hub member is connected to the crankshaft and the second ring member has joined the hub and first ring members together;
   said hub member and said first ring member being curved centrally, radially respectively along their jointure and having a uniform curvature around the circumference of the damper, and
   said second ring member being curved correspondingly as it joins the hub member and the first ring member together,
   wherein the curvature of said second ring member and the space between the hub member and first ring member are selected for achieving reduction of bending vibrations of the crankshaft.

6. The damper in accordance with claim 5 in which said hub member, first ring member and second ring member are curved radially outwardly.

7. The damper in accordance with claim 5 in which said hub member, first ring member and second ring member are curved radially inwardly.

8. A method of tuning with a damper the torsional and bending vibrations of an engine crankshaft, the damper having an inner hub member, an annular outer inertia member, and a resilient member positioned between the hub and inertia members, the method comprising the steps of:
   forming the resilient member from resilient material having a preselected cross-sectional area in the axial direction of the damper sufficient in cooperation with the character of resilience of the material to dampen the torsional vibration of the crankshaft when the resilient member is positioned between the hub and the inertia members,
   the hub and inertia members providing an annular space between them which has a uniform curvature completely around the circumference of the damper,
   curving the cross-sectional area of the resilient member, the outer circumference of the hub member, and the inner circumference of the inertia member radially sufficiently to dampen the bending vibration of the crankshaft when the resilient member is positioned between the hub and inertia members, and
   assembling the damper with said resilient member positioned in the space between said hub member and said inertia member.

9. The method as set forth in claim 8 wherein said resilient member, said outer circumference of the hub member, and said inner circumference of the inertia member are curved radially outwardly.

10. The method as set forth in claim 8 wherein said resilient member, said outer circumference of the hub member, and said inner circumference of the inertia member are curved radially inwardly.

11. A damper for tuning the torsional and bending vibrations of an engine crankshaft, the damper comprising:
   an inner circular hub member for connection to the crankshaft, an annular inertia member spaced radially outwardly from said hub member, the outer circumference of said hub member and the inner circumference of said inertia member having mating uniform radial and axial curvatures and forming a space therebetween, a resilient member positioned between in said space between said hub member and said inertia member, said resilient member filling said space and having a curvature corresponding to the inner circumference of said inertia member and the outer circumference of said hub member, said resilient member having a cross-sectional area and chemical composition sufficient to dampen the torsional vibrations of the crankshaft, said resilient member having a radial curvature sufficient to dampen the bending vibrations of the crankshaft.

12. The damper as set forth in claim 11 wherein said resilient member, said inner circumference of the inertia member and said outer circumference of the hub member are curved radially outwardly.

13. The damper as set forth in claim 11 wherein said resilient member, said inner circumference of the inertia member and said outer circumference of the hub member are curved radially inwardly.

* * * * *